3,395,221
GEL FORMING ALUMINUM HYDROXIDE
Herbert T. Snyder, Morris Plains, and Arthur J. Sikora, Bernardsville, N.J., assignors to Warner-Lambert Pharmaceutical Company, Morris Plains, N.J., a corporation of Delaware
No Drawing. Filed Apr. 15, 1965, Ser. No. 448,242
6 Claims. (Cl. 424—157)

This invention relates to a novel method for the production of a new, improved gel forming aluminum hydroxide which is especially useful in pharmaceutical preparations. More particularly, the present invention relates to a method for the preparation of improved gel forming aluminum hydroxide prepared by reaction of aluminum sulfate and alkali metal hydroxide in an aqueous reaction medium maintained under carefully controlled reaction conditions.

Various hydrous aluminum oxide gels are known and may be prepared by reacting a solution of an aluminum salt such as aluminum chloride or aluminum sulfate with an alkali such as sodium hydroxide, potassium hydroxide, or ammonia hydroxide. Typical examples of such known methods may be found in U.S. Patent Nos. 1,929,942, 2,590,833 and 3,112,995. Because the proportions and concentrations of the particular reactants and reaction conditions are vitally important in preparing hydrous aluminum oxide gels, it is apparent that even slight variations from known processing schemes may result in the preparation of a product having substantially improved characteristics over products prepared by the known methods.

Although satisfactory hydrous aluminum oxide gels can be prepared on a laboratory scale by various techniques known to the art, application of such techniques for production on a commercial scale has been impractical. Frequently, difficulty is encountered, for example, in filtering the prepared slurry and when accomplished by small batch filtration, commercial operation becomes extremely difficult and costly.

In accordance with the present invention, it is possible to prepare a new, improved gel forming aluminum hydroxide having great use in pharmaceutical preparations. Such preparations containing the new, improved gel forming aluminum hydroxide have proven to be highly satisfactory in pharmaceutical preparations primarily because of the ability of the new aluminum hydroxide to form gels upon reaction with excess 0.1 N hydrochloric acid or simulated gastric fluids. These preparations may be characterized as having excellent gel forming properties and are highly effective when taken orally for the treatment or relief of pain of peptic ulcers and the like. The superior characteristics of the new, improved gel forming aluminum hydroxide of the present invention is believed to be related to its ability to provide protective coating of the ulcer. Although the resulting aluminum hydroxide product so prepared is found especially useful in pharmaceutical preparations, a variety of other uses may be readily apparent such as for use as a treating and purifying agent.

It has now been found that by maintaining carefully controlled reaction conditions in an aqueous reaction system comprising a water-soluble aluminum salt and a soluble alkali metal hydroxide results in the preparation of a gel forming aluminum hydroxide having substantially improved characteristics and in partiucular, improved utility for relief of the pain of peptic ulcers over similar preparations employed heretofore. In addition, the process of the present invention is readily adaptable to continuous processing and thereby affords an improved method for preparing gel forming aluminum hydroxide, especially since the process of the present invention has great flexibility and commercial adaptability resulting in the lowering of the cost of producing gel forming aluminum hydroxide for use in pharmaceutical preparations. The present invention also provides the data needed for determining the proportion of reactants required to produce such an aluminum hydroxide and so represents a considerable advance over the prior state of the art.

It is, therefore, an important object of this invention to provide a method for the continuous preparation of gel forming aluminum hydroxide having improved characteristics and which is especially useful as a constituent in pharmaceutical preparations employed for the relief of pain of peptic ulcers and like gastric disorders.

It is another object of this invention to provide stable, thixotropic dispersion of gel forming aluminum hydroxide which differs in properties and uses from aluminum hydroxide preparations produced heretofore.

These and other objects and advantages will become more apparent from the following detailed description of the present invention.

In accordance with this invention, gel forming aluminum hydroxide may be prepared by reacting an aluminum salt with an alkali metal hydroxide in an aqueous reaction medium contained in a suitable reaction vessel equipped with suitable agitation means. The aluminum salt desirably employed in the present reaction is aluminum sulfate, generally iron free, in aqueous solution while the alkali metal hydroxide is preferably sodium hydroxide. The reaction involved may be further illustrated by the following equation:

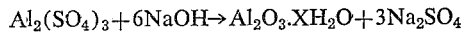

$$Al_2(SO_4)_3 + 6NaOH \rightarrow Al_2O_3 \cdot XH_2O + 3Na_2SO_4$$

wherein X has a value from about 3.30 to about 3.80 and ideally about 3.55.

Control of the reaction conditions is especially important in preparation of the gel forming aluminum hydroxide of the present invention. The pH of the reaction medium is desirably maintained between a pH of about 8.2 to about 8.9 and preferably at about 8.5 and may be controlled by the rate of addition of the reactants. It has been found that a general decrease in the pH is accompanied by an increase of soluble aluminum and sulfate in the final product whereas an increase in pH is generally accompanied by a desirable decrease in the soluble aluminum and sulfate content therein.

The temperature of the reaction medium is also of critical importance and is desirably maintained from about 45° C. to about 60° C. throughout the reaction. A decrease in reaction temperature to and below 40° C. appears to result in a sharp increase in soluable aluminum and sulfate content in the final product whereas an increase in the temperature markedly lowers these properties to more desirable levels.

Agitation of the reaction medium is also important and may be defined as being vigorous with an agitation rate from about 1,000 r.p.m. to about 2,100 r.p.m. The preferred agitation rate is of the order of about 1,500 r.p.m. A general increase in the agitation rate appears to increase the soluble aluminum and sulfate content in the final product.

The contact time of the reaction appears also to be of importance and is desirably from about 5 to about 15 minutes while the reaction takes place within the reaction vessel. It is recognized, however, that some reaction continues in the slurry until filtration thereof.

After passing through the reaction zone the reactor slurry may be continually overflowed to a filter trough or bath wherein the slurry may be diluted with water prior to addition to the filtration unit. Dilution of the slurry with water appears to control the bath temperature while maintaining other desirable slurry conditions. The slurry is desirably diluted with from about 5 parts to about 10 parts by weight of water per part by weight of slurry. The temperature of the diluted slurry is desirably maintained from about 55° C. to about 65° C. and generally about 60° C. It is recognized that higher trough temperatures permit faster filtration although this increase in temperature is generally accompanied by a reduction in the soluble aluminum level in the final product. A decrease in the trough temperature raises the value of the soluble aluminum level but also increases the difficulty of filtration.

It has also been found desirable to maintain the pH of the diluted slurry at from about pH 7.2 to about pH 8.2 and generally in the range of pH 7.7. The contact time of the slurry in the filter trough also appears to be an important factor which alters the solubility of aluminum in the final product without appreciably effecting the gel forming capacity of the resulting aluminum hydroxide. It has been found that a contact time in the filter trough of from about 5 to about 30 minutes is adequate with a time from about 10 to about 20 minutes generally sufficient.

The diluted slurry is next continuously filtered by any suitable means such as, for example, a drum filter wherein the wet filter cake is continually washed with either tap water or distilled water maintained at a temperature from about 20° C. to about 90° C. and generally from about 25° C. to about 30° C. Although tap water is preferred for convenience and economy, distilled water may also be employed as in all other cases where water is used herein. Dilute solutions of ammonia may also be employed to wash the filter cake to control the soluble aluminum and sulfate levels of the final product.

After the precipitated aluminum hydroxide has been diluted and filtered, the wet cake discharged from the filter may then be either dried for use in tablets, granulations and the like, or it may be added directly as a wet cake and made a constituent of a liquid therapeutic preparation.

When the aluminum hydroxide obtained as described above is processed to a dry form, a white, odorless powder which is essentially amorphous results.

When the aluminum hydroxide of the present invention is added to an excess of 0.1 N hydrochloride acid, a uniformly suspended hydrated colloidal gel is formed, the chemistry of which remains evasive. The soluble aluminum content, however, of the gel forming aluminum hydroxide is generally from about 10% to about 20% of the aluminum hydroxide originally added on a dry weight basis. In the dried form, analysis indicates that the prepared composition contains from about 50% to about 70% $Al_2O_3$.

In order to further illustrate the practice of the present invention, the following example is given:

EXAMPLE 0.124 gallon per minute of aluminum sulfate ($Al_2(SO_4)_3 \cdot 18H_2O$) solution having 50% solids in solution and 0.04 gallon per minute of sodium hydroxide solution having 50% solids in solution, and 0.11 gallon per minute of water maintained at a temperature from about 50 to 60° C. are introduced into a reaction equipped with a suitable agitator. The temperature of the reaction mixture is maintained at about 50° C. and a pH of about 8.55. An agitator suspended in the reactor is rotated at about 1,500 r.p.m. to suitably provide a vigorous vortex and insure complete mixing of the reactants. The contact time in the reactor is about 7 minutes after which the resultant slurry is continually overflowed at a rate of about 0.3 gallon per minute and the overflow is pumped to a filter trough where the slurry is diluted with 8 parts by weight of water per part by weight of slurry. The temperature of the diluted slurry is maintained at about 60° C. and a pH of about 7.7–7.8. The contact time of the diluted slurry in the filter trough is about 12 minutes after which the slurry is continually fed to a filter drum where the filter cake is washed with about 2 gallons of water per pound of cake. The wash water is maintained at a temperature of about 25° C. The washed cake is removed from the filter at a rate of about one pound per minute and is found to have an $Al_2O_3$ analysis of about 12.5%. The wet cake is then dried in a suitable dryer maintained at a temperature of about 120° C. from which the dry product is removed at a rate of about 0.2 pound per minute and having an $Al_2O_3$ content of about 61.3%, a soluble Al content of about 14.8%, and a total $SO_4$ content of about 7.9%. The acid-consuming capacity of this product, i.e., the capacity to neutralize 0.1 N HCl according to prescribed techniques is found to be about 160 ml. per gram of dried gel. The dried cake may be ground to a fine powder capable of passing through at least a 140 mesh screen prior to being added as a constituent to an antacid preparation. This dried powder may then be formulated into tablets with other materials such as calcium carbonate, magnesium trisilicate, sodium bicarbonate, magnesium ammonium phosphate, oil of peppermint, saccharin and like materials. Alternately, the wet cake may be added directly as a constituent to a liquid therapeutic preparation along with materials such as oil of peppermint, magnesium ammonium phosphate, magnesium trisilicate and the like. Such therapeutic products containing the gel forming aluminum hydroxide as prepared herein are found to have great use in the treatment of gastric hyperacidity in peptic ulcer treatment.

It is understood that the foregoing detailed description is given merely by way of illustration and that many variations may be made therein without departing from the spirit of the present invention.

What is claimed is:

1. A method for the preparation of gel forming aluminum hydroxide which comprises,
    (a) reacting an aluminum salt with an alkali metal hydroxide in an aqueous reaction medium having a pH maintained at about 8.2 to about 8.9, a reaction temperature of from about 45° C. to about 60° C., and a reaction time of from about 5 to about 15 minutes;
    (b) filtering the reaction slurry prepared by Step (a) after diluting the slurry with from about 5 parts to about 10 parts by weight of water per part by weight of slurry; and
    (c) recovering gel forming aluminum hydroxide.

2. A method for the preparation of gel forming aluminum hydroxide which comprises,
    (a) reacting aluminum sulfate with sodium hydroxide in an aqueous reaction medium having a pH maintained at about 8.2 to about 8.9, a reaction temperature of from about 45° C. to about 60° C., and a reaction time of from about 5 to about 15 minutes;
    (b) filtering the reaction slurry prepared by Step (a) after diluting the slurry with from about 5 parts to about 10 parts by weight of water per part by weight of slurry; and
    (c) recovering gel forming aluminum hydroxide.

3. A method for the preparation of gel forming aluminum hydroxide which comprises,
    (a) reacting aluminum sulfate with sodium hydroxide in an aqueous reaction medium having a pH maintained at about 8.2 to about 8.9, a reaction temperature of from about 45° C. to about 60° C., and a reaction time of from about 5 to about 15 minutes;
    (b) filtering the reaction slurry prepared in Step (a) after dilution from about 5 to about 10 parts by weight of water per part by weight of slurry, said diluted slurry maintained at a temperature from about 55° C. to about 65° C. and a pH from about 7.2 to about 8.2;
    (c) drying the discharged wet cake from the filter by Step (b) and (d) recovering gel forming aluminum hydroxide as a substantially dry product.

4. The product prepared by the process of claim 1.

5. A therapeutic composition which comprises the product prepared by the process of claim 1 suspended in water.

6. A dry therapeutic composition which comprises the dry product prepared by the process of claim 3.

References Cited

UNITED STATES PATENTS 2,999,790  9/1961  Alford _____ 167—55

ALBERT T. MEYERS, *Primary Examiner.*

SAM ROSEN, *Assistant Examiner.*